Patented Oct. 5, 1954

2,690,780

UNITED STATES PATENT OFFICE 2,690,780

COMPOUNDING OF BUTYL RUBBER

Edward Cousins, Akron, Ohio, assignor, by mesne assignments, to The Goodyear Tire & Rubber Company, a corporation of Ohio No Drawing. Application June 16, 1951,
Serial No. 232,070

14 Claims. (Cl. 152—349)

This invention relates to elastomeric synthetic polymers and, more particularly, to polymers possessing improved properties in the unvulcanized and vulcanized states. Still more specifically, the invention relates to the use of certain compounding ingredients for butyl rubber which improve the unvulcanized and vulcanized physical properties of the rubber. This invention also relates to the use of the improved rubber in the fabrication of coated fabrics for life rafts, and in the fabrication of tubes for pneumatic tires.

The term "butyl rubber" as used in the specification and in the appended claims is well known in the art as descriptive of the elastomeric polymers formed by polymerizing a major proportion of an iso-olefin, such as isobutylene, with a minor proportion of a multi-olefin, such as for example, isoprene, butadiene, piperylene, dimethyl butadiene, and similar multi-olefinic unsaturates.

Butyl rubber has found wide acceptance in the pneumatic tire industry for the fabrication of tubes because of its excellent resistance to diffusion of air. However, the known methods of compounding butyl rubber produce a material which presents many serious problems to the fabricator and user. The rubber has a relatively low modulus and a relatively high plasticity compared to natural rubber. As a result, the compounded rubber, when subjected to the necessary processing steps in fabricating a finished product, shows a tendency to bruise (i. e., the rubber shows little resistance to flow, having properties more plastic than rubber-like), which causes thin spots in the article being fabricated, the thin spots subsequently resulting in a weakened finished article. Also, the compounded butyl rubber becomes excessively soft and sticky when subjected to the elevated temperatures required for milling and calendering. This softening of the unvulcanized butyl rubber at elevated temperatures is particularly objectionable when a fabric is being coated with a solution of the rubber since the solvent in the rubber solution must be driven off by heat, and the required heating causes the coated fabric to stick to the processing equipment.

Furthermore, after the butyl rubber has been cured into a finished product, such as an inner tube for automobile tires, the stock is sluggish. It appears to have no life and has a tendency to "cold flow," especially at lower temperatures. The observed "cold flow," it is believed, is caused by the properties of the cured butyl rubber which, as mentioned, appear to be more plastic than rubber-like. The cold flow of butyl rubber is particularly objectionable in inner tubes where the flowing of the rubber inside the tire, and subsequent pinching of the tube at the point of flow, may cause the tube to blow out. Another objection to cured butyl rubber is that when it is used as a coating for fabric, its resistance to gas diffusion diminishes as the time of exposure to sustained gas pressure is increased, with the result that, when used for inflatable products, such as life rafts, the coated fabric does not effectively retain the gas over prolonged periods of time.

It is the broad object of this invention to provide a butyl rubber which is compounded to minimize all of the above objections to butyl rubber compounded according to known techniques. A particular object of this invention is to provide a butyl rubber which is livelier and has less tendency to cold flow in the cured state. Another object is to provide a butyl rubber compound which possesses improved resilience and abrasion resistance. Still another object is to improve the resistance of fabric (made from both natural and synthetic fibers) coated with butyl rubber to the diffusion of gas under sustained pressure. Another object is to improve the processing of butyl rubber on the mill, calender and spreader. Another object is the production of improved tubes for pneumatic tires and fabrics coated with butyl rubber and processes for their fabrication. Other objects will become apparent as the description proceeds.

According to the practice of this invention, the foregoing objects are accomplished and a butyl rubber of improved characteristics is obtained by compounding the rubber with a combination of certain compounding ingredients, neither one of which by itself will give the desired result. Specifically, the improved butyl rubber compound is produced by mixing into the rubber an organic isocyanate and an aromatic dinitroso compound or an aromatic dioxime.

Any organic isocyanate may be used in the practice of this invention. Representative examples are the monoisocyanates, such as the aliphatic compounds, ethyl isocyanate, isobutyl isocyanate, and octadecyl isocyanate, and the aromatic compounds, such as phenyl isocyanate, naphthyl isocyanate, and tolyl isocyanate; the diisocyanates, such as the aliphatic compounds ethylene diisocyanate, hexamethylene diisocyanate, propylene-1,2 diisocyanate, butylene-1,2 diisocyanate, and ethylidene diisocyanate; the cycloalkylene compounds, such as cyclopentylene-1,3 diisocyanate and cyclohexylene-1,2 diisocyanate; the aromatic compounds such as p-phenylene diisocyanate, 4,4'-diphenylene diisocyanate, and 1,5-naphthalene diisocyanate; the aliphatic-aromatic compounds such as 4,4'-diphenylene methane diisocyanate and 2,4-tolylene diisocyanate and the nuclear substituted aromatic compounds, such as dianisidine diisocyanate, and 4,4'-diphenyl ether diisocyanate; the triisocyanates such as 4,4',4''-triphenyl methane triisocyanate and 2,4,6-triisocyanto toluene; the tetraisocyanates such as 4,4'-dimethyl-diphenyl methane 2,2',5,5' tetraisocyanate and the higher polyisocyanates.

Mixtures of the isocyanates may also be employed. The isocyanate mixtures which have been found to be particularly effective in accomplishing the purposes of this invention are those described in U. S. application Serial No. 206,506, filed January 17, 1951. These mixtures, as described therein, are the polyisocyanates resulting from the phosgenation of the condensation product of aryl mono primary amines and aliphatic or aromatic aldehydes or ketones. By controlling the molecular ratio of amine to aldehyde or ketone in a range of from 4:2.5 to 4:3.5 with the amine being present in the larger molecular amount, a polyisocyanate mixture is produced by subsequent phosgenation in which the diisocyanate portion is present in an amount not to exceed approximately 40% by weight of the mixture.

A structural formula which defines the mixture of polyisocyanates described in U. S. application Serial No. 206,506 and which has proven to be particularly effective in accomplishing the purposes of this invention is

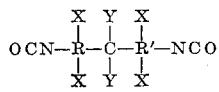

in which R and R' are arylene radicals, Y is selected from the group consisting of hydrogen, alkyl, and aryl radicals, and X is selected from the group consisting of hydrogen and a radical defined by the formula

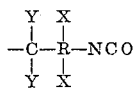

in which R, X and Y are as defined above.

Alternatively the mixtures of polyisocyanates may be defined by the empirical formula

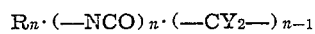

in which R is an arylene radical, Y is selected from the group consisting of hydrogen, alkyl and aryl radicals, $n$ is a whole number greater than 1 and in which each R radical is substituted by an —NCO group and in which the R radicals are linked together by a —$CY_2$— group.

Representative examples of the aryl mono primary amines which may be reacted with an aldehyde or ketone in the formation of the polyamines are aniline, the nuclear substituted phenyl amines such as ortho, meta, and para chloroaniline; ortho, meta, and para toluidine; ortho, meta, and para phenetidine; ortho, meta, and para anisidine; and ortho, meta, and para xylidine; ortho, meta, para xenyl amines, and alpha and beta naphthylamine. Mixtures of these aryl mono primary amines may also be used in the reaction.

Representative examples of the aldehydes and ketones which may be employed to react with the foregoing amines are the aliphatic aldehydes, such as formaldehyde, acetaldehyde, propionaldehyde, butyraldehyde and nonylaldehyde; the aromatic aldehydes such as benzaldehyde; the aliphatic ketones such as methyl ethyl ketone, acetone, the pentanones, and hexanones, and the aromatic ketones such as acetophenone, benzophenone and propiophenone. Mixtures of these compounds may also be used.

Preferred polyisocyanates are those obtained by the phosgenation of the polyamines resulting from the reaction of aniline with formaldehyde, benzaldehyde, acetaldehyde, methyl ethyl ketone or acetone; ortho toluidine with formaldehyde, benzaldehyde, acetaldehyde, methyl ethyl ketone or acetone; ortho chloroaniline with formaldehyde, benzaldehyde, acetaldehyde, methyl ethyl ketone or acetone; ortho anisidine with formaldehyde, benzaldehyde, acetaldehyde, methyl ethyl ketone, or acetone; and alpha naphthyl amine with formaldehyde, benzaldehyde, acetaldehyde, methyl ethyl ketone, or acetone.

While the monoisocyanates and the diisocyanates have proven to be effective, it is the higher polyisocyanates and particularly the polyisocyanate mixtures described above, which are preferred in the practice of this invention.

It has been found that by using as little as 0.1 part and as much as 20 parts by weight of the isocyanate to 100 parts by weight of butyl rubber in the presence of the dinitroso or the dioxime compound, the improved results can be accomplished. While, as is true in most rubber compounding, the exact amount of isocyanate will be dependent in part upon the other materials to be used and the purpose for which the compound is made, a preferred range is from 0.25 to 10 parts of isocyanate by weight to 100 parts of butyl rubber. Amounts of isocyanate in excess of 10 parts, while effective, do not appear to add to the improvement in the physical properties of the rubber.

Any aromatic dinitroso compound may be used in the practice of this invention. Representative examples of the aromatic compounds are the aryl compounds, which are preferred, such as the dinitroso derivatives of benzene, cymene, toluene, and naphthalene. The para-dinitroso compounds are preferred since the meta compounds, though nearly as effective, are more difficult to obtain commercially. A preferred compound is para dinitroso benzene since it is easily obtained and is highly efficient.

It is known that the dioximes can be oxidized to the corresponding dinitroso compounds. For example, para-quinone dioxime can be readily oxidized to dinitroso benzene. It is believed that when a dioxime is mixed into butyl rubber and heat is applied, as in vulcanization, the dioxime becomes oxidized to the corresponding dinitroso compound. A dioxime, therefore, will produce the same effect as if the dinitroso compound had been added initially. For the purposes of this invention, the dioximes may be considered as the equivalents of the corresponding dinitroso compounds into which they can be oxidized. Representative examples of the dioximes which are useful in the practice of this invention are para-quinone dioxime, naphthoquinone dioxime, toluquinone dioxime, diphenoquinone dioxime and diquinoyl dioxime. Mixtures of the dinitroso and dioxime compounds may also be employed.

It has been found that the use of as little as 0.01 part and as much as 1.00 part by weight of the dinitroso or dioxime compound per 100 parts by weight of the butyl rubber will produce the desired result when used in conjunction with the required amount of isocyanate. A preferred range is from 0.05 to 0.50 part by weight of the dinitroso or dioxime compound per 100 parts by weight of butyl rubber. Since the dinitroso and the dioxime compounds are known to be curing agents for butyl rubber, amounts of the dinitroso or dioxime compound in excess of 1 part by weight are to be avoided because the resulting rubber compound tends to pre-cure during the processing steps required to fabricate a finished product.

The use of aromatic dinitroso compounds in the compounding of butyl rubber has been previously described and is said to increase the bruise resistance of uncured butyl rubber but to result in no improvement in physical properties of the cured rubber. However, attempts to duplicate the effect on bruise resistance of butyl rubber, said to be achieved by the incorporation of an aromatic dinitroso compound therein have yielded negative results as shown by the tests described below. According to the present invention in which the dinitroso or dioxime compound is combined with an organic isocyanate in the compounding of butyl rubber, a substantial improvement is realized not only in the uncured material but more particularly in the physical properties of the cured material.

The results of the tests shown below indicate that the physical properties of butyl rubber compounded in accordance with the principles of this invention are markedly improved over the same properties of butyl rubber compounds previously known. In particular, the uncured butyl rubber compounds prepared in accordance with the principles of this invention show improved plasticity characteristics, in that they have higher recovery values indicating a more rubbery material which tends to resume its former shape when a displacing force is relaxed or removed. It is believed the improved bruise resistance of the butyl rubber compounds is attributable in part to these higher recovery values. The improved butyl rubber compounds in the cured state display properties indicating a higher modulus, greater resistance to stretch, higher resistance to abrasion, greater resilience, less stiffness at low temperatures, greater resistance to diffusion of air under sustained pressure and less cold flow.

Especially important is the improved resistance to diffusion of air or other gases. While butyl rubber itself is known to retain air extremely well, in the form of a coating for fabric, the butyl rubber displays an original resistance to diffusion, which resistance diminishes with the passage of time. When the rubber is compounded as herein described the resistance to diffusion is maintained at a high level indefinitely. The improvement in plastic creep is also important because when the butyl rubber is used in tire tubes such creep has heretofore resulted in pinching of the tube and tire failure in cold climates.

Table I shows compounds prepared using the desired combination of compounding ingredients and the individual ingredients alone. Parts shown are by weight.

*Table I*

| Compound | 1 | 2 | 3 | 4 | 5 | 6 | 7 | 8 | 9 |
|---|---|---|---|---|---|---|---|---|---|
| Butyl Rubber | 100 | | | | | | | | |
| Carbon Black | 50 | | | | | | | | |
| Paraffin | 2 | | | | | | | | |
| Zinc Oxide | 5 | | | | | | | | |
| Captax | 0.5 | | | | | | | | |
| Tuads | 1.0 | | | | | | | | |
| Sulfur | 2.0 | | | | | | | | |
| Dinitroso Benzene | | 0.125 | | 0.125 | 0.125 | 0.125 | 0.125 | 0.125 | |
| Polyisocyanate | | | 10.0 | 0.5 | 1.0 | 2.0 | 5.0 | 10.0 | 2.0 |

Captax is mercapto benzothiazole.

Tuads is tetra methyl thiuram disulfide.

The polyisocyanate is a mixture of diisocyanate, triisocyanate, tetra isocyanate, etc., prepared by the phosgenation of an aniline-formaldehyde condensation product described in United States patent application Serial No. 206,506, filed January 17, 1951. This polyisocyanate mixture has an amine equivalent of 137 and an average molecular weight of 400. The butyl rubber and the compounding ingredients were mixed together on a mill in accordance with normal practice.

To illustrate the change in the uncured physical properties of the compounded butyl rubber, Williams plasticities were run on the respective compounds using a five kilogram weight at 70° C. Plasticities were determined after 3½ minutes, and the recoveries were taken 1 minute after the load was released. Results were as follows:

| Compound | 1 | 2 | 3 | 4 | 5 | 6 | 7 | 8 | 9 |
|---|---|---|---|---|---|---|---|---|---|
| Plasticity | 502 | 554 | 462 | 579 | 571 | 580 | 537 | 541 | 473 |
| Recovery | 50 | 86 | 66 | 104 | 126 | 131 | 133 | 111 | 71 |

The increase in the recovery figure observed in those compounds containing the dinitroso-isocyanate combination over those not containing it is a measure of the improvement in the resistance of those compounds to flow under pressure. Neither the dinitroso compound alone (2) nor the isocyanate alone (3) shows as much increase in recovery as do the compounds containing the combination.

The increase in modulus values by use of the dinitroso-isocyanate combination illustrates the increased resistance to stretch at higher elongations. The pull in pounds per square inch required to elongate a test sample 300% is as follows:

| Compound | 1 | 2 | 3 | 4 | 5 | 6 | 7 | 8 | 9 |
|---|---|---|---|---|---|---|---|---|---|
| Modulus | 810 | 1,070 | 300 | 1,150 | 1,330 | 1,380 | 1,360 | 370 | 1,050 |

The rebound and deflection characteristics illustrate the increased resilience of the dinitroso-isocyanate combination compounds. These tests were run according to A. S. T. M. Standard D 1054–49T.

| Compound | 1 | 2 | 3 | 4 | 5 | 6 | 7 | 8 | 9 |
|---|---|---|---|---|---|---|---|---|---|
| Rebound, percent | 40.3 | 41.1 | (*) | 42.0 | 42.4 | 42.9 | 42.9 | (*) | 41.1 |
| Deflection | .234 | .235 | (*) | .237 | .236 | .234 | .220 | (*) | .213 |

*These compounds were not tested.

To show the improvement in abrasion properties of the compounds prepared according to the teachings of this invention, the following Taber abrasion tests were run with results being expressed as grams loss per 1000 cycles.

| Compound | 1 | 2 | 3 | 4 | 5 | 6 | 7 | 8 | 9 |
|---|---|---|---|---|---|---|---|---|---|
| Loss | .303 | .266 | (*) | .148 | .105 | .121 | .148 | (*) | (*) |

*Satisfactory results were not obtained on these compounds because they gummed up the abrasion disc.

Tests were run on the samples to show the improved thermoplastic properties of the cured compounds at reduced temperatures. The stiffness of the compounds at room temperature and at −20° F. were determined by test procedures described as D 1053–49T on page 1199 of A S. T. M. Standards on Rubber Products (1950). The ratio of the stiffness of the compounds at −20° F. to that at room temperature is presented below.

| Compound | 1 | 2 | 3 | 4 | 5 | 6 | 7 | 8 | 9 |
|---|---|---|---|---|---|---|---|---|---|
| Ratio | 2.44 | 2.41 | 2.60 | 1.60 | 1.76 | 1.61 | 1.68 | 2.01 | 1.86 |

The above tests indicate that the dinitroso-isocyanate combination results in butyl rubber compounds which are less stiff at reduced temperatures and hence preserves the usefulness of those products to a greater degree. All of the results shown except plasticities were run on test samples cured for 100 minutes at 275° F.

Table II below represents the formula of and test data obtained on cured butyl rubber compounds which were tested for resistance to elongation under tension. The formulae are represented in parts by weight. The percent creep is determined by subjecting a test sample approximately ⅛" wide and .080" thick (cured for 40 minutes at 300° F.) to a pull of 414 grams, measuring the percent original elongation, placing the elongated samples under the 414 gram pull in an oven for 22 hours at 158° F., measuring the amount of additional elongation in the aged samples, and computing the amount of creep in the aged samples based upon the original elongation.

Table II

| Compound | 10 | 11 | 12 | 13 |
|---|---|---|---|---|
| Butyl Rubber | 100 | | | |
| Sulfur | 2 | | | |
| Zinc Oxide | 5 | | | |
| Captax | .5 | | | |
| Tuads | 1.0 | | | |
| Stearic Acid | 1.0 | | | |
| Paraffin | 1.0 | | | |
| Silicon dioxide | 40 | | | |
| Lead Chromate | 15 | | | |
| Ferric Oxide | 0.15 | | | |
| Dinitroso Benzene | 0.25 | 0.25 | 0.25 | 0.25 |
| Polyisocyanate | | 1.00 | 2.00 | 10.00 |
| Percent Creep | 35.1 | 24.0 | 23.3 | 18.3 |

Captax, Tuads, and the polyisocyanate are as defined in Table I. The rubber and the compounding materials were milled together in accordance with normal procedures.

Analysis of the results shown in Table II indicates improvement in the resistance to elongation under tension of butyl rubber compounds containing the dinitroso-isocyanate combination with the isocyanate being present in varying proportions.

To illustrate the effectiveness of various isocyanates in the practice of this invention, Table III lists the physical test results obtained using the base formula shown in Table I represented by Compound I and the dinitroso compound and isocyanate indicated. Parts are shown by weight. The test conditions are the same as those indicated for the compounds listed in Table I. The test samples were cured for 100 minutes at 275° F.

Table III

| Compound | 1 | 6 | 14 | 15 | 16 | 17 | 18 |
|---|---|---|---|---|---|---|---|
| p-dinitroso benzene | 0 | 0.125 | 0.125 | 0.125 | 0.125 | 0.125 | 0.125 |
| Isocyanate A | | 2.0 | | | | | |
| Isocyanate B | | | 4.6 | | | | |
| Isocyanate C | | | | 2.65 | | | |
| Isocyanate D | | | | | 1.95 | | |
| Isocyanate E | | | | | | 2.00 | |
| Isocyanate F | | | | | | | 1.40 |
| Plasticity | 502 | 580 | 473 | 497 | 644 | 630 | 573 |
| Recovery | 50 | 131 | 71 | 80 | 156 | 148 | 139 |
| 300% Modulus | 810 | 1,380 | 720 | 1,010 | 1,550 | 1,170 | 1,090 |
| Rebound | 40.3 | 42.9 | 40.3 | 40.3 | 43.3 | 42.9 | 42.9 |
| Deflection | .234 | .234 | .229 | .221 | .228 | .222 | .221 |
| Abrasion | .303 | .121 | .108 | .115 | .128 | .128 | .103 |
| Stiffness Ratio | 2.44 | 1.61 | .168 | 1.73 | 1.68 | 1.54 | 1.54 |

Isocyanate A—The polyisocyanate mixture defined in Table I.
Isocyanate B—Octadecyl isocyanate.
Isocyanate C—Naphthyl isocyanate.
Isocyanate D—Triphenyl methane tri-isocyanate.
Isocyanate E—Diphenyl methane diisocyanate.
Isocyanate F—2,4-tolylene diisocyanate.

From the results shown in Table III, it is evident that dinitroso-isocyanate compounds show substantial improvement in physical properties over the control, particularly in recovery, abrasion, and stiffness.

Similar results to those shown in Tables I, II, and III can be obtained by the use of dioxime compounds as replacements for the dinitroso compounds.

In addition to the improved physical properties, it has been observed that when butyl rubber is compounded with a dinitroso or a dioxime compound and an organic isocyanate, the compounded material processes more satisfactorily at the mill, calendar, and spreader. The improved compound does not become soft nor does it stick to the mill rolls and calender rolls because of the rise in temperature due to the heat generated in the rubber while it is being worked. When applied to a fabric as a cement in the spreading operation, the improved butyl rubber compound permits a strong application of drying heat without becoming soft and sticky. The result is that the solvent can be completely evaporated thus eliminating in subsequent operations the possibility of blistering arising from solvent retention. Also, the firm, dry surface of the deposited coating facilitates handling operations.

I claim:

1. As a new composition of matter an elastomeric material comprising 100 parts by weight of a synthetic rubber formed by polymerizing a major proportion of an iso-olefin and a minor proportion of a multi-olefin, from 0.01 to 1.00 part by weight of (A) an organic nitrogen-bearing compound selected from the group consisting of aryl dinitroso compounds and aryl dioximes, and from 0.10 to 20,200 parts by weight of (B) at least one organic isocyanate compound containing at least one isocyanate group.

2. The composition defined by claim 1 in which (A) is used in an amount ranging from 0.05 to 0.50 part by weight and (B) is used in a range from 0.25 to 10.00 parts by weight.

3. The composition defined by claim 1 in which (B) is at least one aromatic isocyanate compound containing at least one isocyanate group.

4. The composition defined by claim 1 in which (B) is at least one aralkyl isocyanate compound containing at least one isocyanate group.

5. The composition defined by claim 1 in which (A) is para-dinitroso benzene.

6. The composition of matter defined by claim 1 in which (B) is the mixture of polyisocyanates corresponding to the empirical formula

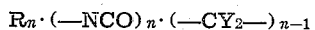

in which R is an arylene radical, Y is selected from the group consisting of hydrogen, alkyl, and aryl radicals, $n$ is a whole number greater than one, and in which each R radical is substituted by an —NCO group and in which the R radicals are linked together by a —CY$_2$— group.

7. The composition of matter defined by claim 6 in which (A) is para-dinitroso benzene.

8. The composition of matter defined by claim 2 in which (B) is a mixture of polyisocyanates corresponding to the empirical formula

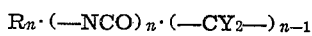

in which R is an arylene radical, Y is selected from the group consisting of hydrogen, alkyl, and aryl radicals, $n$ is a whole number greater than one, and in which each R radical is substituted by an —NCO group and in which the R radicals are linked together by a —CY$_2$— group, said mixture of polyisocyanates comprising from 0 to 40% by weight of the diisocyanate and from 100% to 60% by weight of polyisocyanates containing more than two —NCO equivalents per mol of polyisocyanate.

9. An inner tube comprising a synthetic rubber formed by polymerizing a major proportion of an iso-olefin and a minor proportion of a multi-olefin, said rubber being compounded with from 0.01 to 1.00 part by weight of (A) an organic nitrogen-bearing compound selected from the group consisting of aryl dinitroso compounds and aryl dioximes, and from 0.10 to 20.00 parts by weight of (B) at least one organic isocyanate compound containing at least one isocyanate group and thereafter cured.

10. An inner tube defined by claim 9 in which (A) is para-dinitroso benzene and (B) is a mixture of polyisocyanates corresponding to the empirical formula

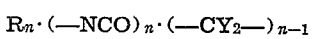

in which R is an arylene radical, Y is selected from the group consisting of hydrogen, alkyl, and aryl radicals, $n$ is a whole number greater than one, and in which each R radical is substituted by an —NCO group and in which the R radicals are linked together by a —CY$_2$— group, said mixture of polyisocyanates comprising from 0 to 40% by weight of the diisocyanate and from 100% to 60% by weight of polyisocyanates containing more than two —NCO equivalents per mol of polyisocyanate.

11. In a process for the manufacture of a coated fabric the step which comprises coating at least one side of the fabric with an elastomeric compound comprising 100 parts by weight of a synthetic rubber formed by polymerizing a major proportion of an iso-olefin and a minor proportion of a multi-olefin from 0.01 to 1.00 part by weight of (A) an organic nitrogen-bearing compound selected from the group consisting of aryl dinitroso compounds and aryl dioximes, and from 0.10 to 20.00 parts by weight of (B) at least one organic isocyanate compound containing at least one isocyanate group.

12. The step in the process defined by claim 11 in which (A) is para-dinitroso benzene and (B) is a mixture of polyisocyanates corresponding to the empirical formula

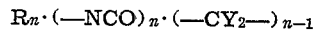

in which R is an arylene radical, Y is selected from the group consisting of hydrogen, alkyl, and aryl radicals, $n$ is a whole number greater than one, and in which each R radical is substituted by an —NCO group and in which the R radicals are linked together by a —CY$_2$— group, said mixture of polyisocyanates comprising from 0 to 40% by weight of the diisocyanate and from 100% to 60% by weight of polyisocyanates containing more than two —NCO equivalents per mol of polyisocyanate.

13. An article of manufacture comprising a fabric base coated on at least one side with elastomeric composition comprising 100 parts by weight of a synthetic rubber formed by polymerizing a major proportion of an iso-olefin and a minor proportion of a multi-olefin, from 0.01 to 1.00 part by weight of (A) an organic nitrogen-bearing compound selected from the group consisting of aryl dinitroso compounds and aryl dioximes, and from 0.10 to 20.00 parts by weight of (B) at least one organic isocyanate compound containing at least one isocyanate group.

14. The article of manufacture defined by claim 13 in which (A) is para-dinitroso benzene and (B) is a mixture of polyisocyanates corresponding to the empirical formula

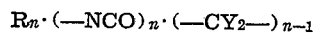

in which R is an arylene radical, Y is selected from the group consisting of hydrogen, alkyl, and aryl radicals, $n$ is a whole number greater than one, and in which each R radical is substituted by an —NCO group and in which the R radicals are linked together by a —CY$_2$— group, said mixture of polyisocyanates comprising from 0 to 40% by weight of the diisocyanate and from 100% to 60% by weight of polyisocyanates containing more than two —NCO equivalents per mol of polyisocyanate.

References Cited in the file of this patent

UNITED STATES PATENTS

| Number | Name | Date |
|---|---|---|
| 2,526,504 | Rehner | Oct. 17, 1950 |

OTHER REFERENCES

Meyrick et al., Trans. Inst. Rubber Ind., pages 150, 164 (October 1949).